June 22, 1926.
S. W. NELSON
1,589,859
MOTOR VEHICLE SPRING SUSPENSION SYSTEM
Filed August 8, 1925
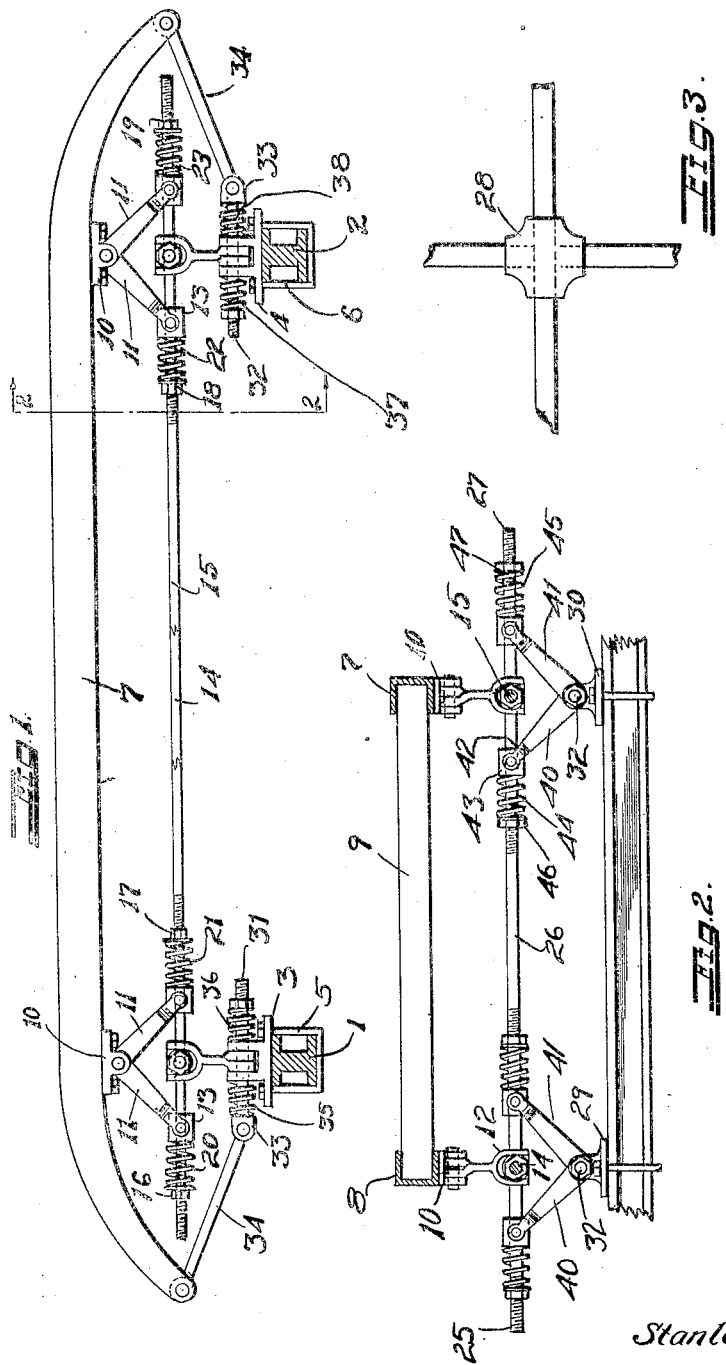
INVENTOR.
Stanley W. Nelson.
BY
Carl P. Griffin
ATTORNEY.

Patented June 22, 1926.

1,589,859

UNITED STATES PATENT OFFICE.

STANLEY W. NELSON, OF SAN FRANCISCO, CALIFORNIA.

MOTOR-VEHICLE-SPRING SUSPENSION SYSTEM.

Application filed August 8, 1925. Serial No. 48,931.

This invention relates to a motor vehicle spring suspension system, and its object is to provide means whereby a comparatively simple system of levers and a plurality of interchangeable spiral springs may be used to take the place of the present leaf spring systems.

An object of the invention is to provide a suspension system which will have adequate resiliency without the defects of lack of stabilization found in many spring systems; the arrangement in the present case being such as to cause one set of springs to more or less effect all of the others, while the vehicle body is as little disturbed as possible.

Another object of the invention is to provide a spring suspension system which will have less area of frictional surfaces in contact with each other than is the case with the ordinary leaf spring, where a large number of springs are used with the surfaces of each leaf in contact with the surfaces of the two other leaves, such springs ordinarily have from seven to ten and twelve leaves, and even though the movement is not great longitudinally in each individual instance the number of leaves is such that the frictional resistance to movement is considerable.

Another object of the invention is to produce a spring suspension system in which the effect of spring movement at one point will be more or less carried to the other points of the suspended vehicle frame without seriously interfering with the proper support of said vehicle frame.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of a vehicle showing a car frame supported by this system, the axles being merely diagrammatically illustrated.

Fig. 2 is a sectional view of a car frame looking in the direction of the arrows in the section line 2—2, Fig. 1.

Fig. 3 is a plan view of the member connecting the longitudinally and transversely extending rods.

The numerals 1 and 2 indicate the front and rear axles respectively, of a vehicle, attached to which axles are the brackets 3 and 4, which are secured to the axle by means of the U-bolts 5 and 6.

The frame of the vehicle may be of any suitable type with side rails 7 and 8, connected by a suitable number of cross-members 9.

Attached to the underside of the frame of the vehicle are four bearings 10, only three of which are illustrated in the drawing, which bearings are pivotally connected to eight downwardly extending arms 11.

Each of the arms 11 is provided with a yoke 12 at its lower end, whereby it is connected to a block 13, slidable on either one of two rods 14, 15, which extend longitudinally substantially the entire length of the frame. These rods are threaded at four places to receive nuts 16 to 19 inclusive, and they hold springs 20 to 23 inclusive in place against the blocks 13 with such force as may be necessary to properly support the vehicle frame.

Extending transversely from each of the rods 14 and 15, at front and back of the machine over the axle, are the rods 25, 26 and 27, which rods are connected to a heavy threaded hub or pipe cross 28 at each intersection with the two rods 14 and 15, of which there are four.

Each axle supports two brackets 29, 30, which form bearings for the pins 31, 32, two over each axle. These pins each have yokes 33, which are connected to links 34, in turn pivotally connected to the ends of the frame members of the vehicle.

Each bearing pin 31, 32, is pivotally connected to two links 40, 41, substantially identical with the links 11, and said links each have a yoke 42 at their upper ends, which yokes are pivotally connected to slides 43 mounted on the transversely extending rods.

Springs 44, 45, and nuts 46, 47, hold the vehicle frame in the proper position transversely with respect to the supporting axle.

It will be seen from the foregoing description that the weight placed on the vehicle frame will tend to support the links 11, and the links 40, 41, away from each other in pairs, which spreading is resisted by the springs, and which spring arrangement effectually stabilizes and improves the riding qualities of the vehicle frame.

What I claim is as follows, but modifications may be made in carrying out the invention shown in the drawings and in the above particularly described form thereof, within the purview of the invention, as defined by the annexed claims:

1. In combination with the supporting axles of a vehicle of a plurality of arms pivotally mounted thereon, springs to hold said arms resiliently in a given position, supports extending from said arms to another set of arms substantially at right angles to the first arms, springs to hold the latter arms resiliently in a given position, and a vehicle frame to which the latter arms are pivotally connected.

2. In combination with the supporting axles of a vehicle of a plurality of arms pivotally mounted thereon, springs to hold said arms resiliently in a given position, supports extending from said arms to another set of arms substantially at right angles to the first arms, springs to hold the latter arms resiliently in a given position, a vehicle frame to which the latter arms are pivotally connected, and means connecting the vehicle frame and axle to hold the frame and axle resiliently in a given position In testimony whereof I have hereunto set my hand this 31st day of July, A. D., 1925.

STANLEY W. NELSON.